(12) United States Patent
Elbanhawy (10) Patent No.: US 7,872,883 B1
(45) Date of Patent: Jan. 18, 2011

(54) SYNCHRONOUS BUCK POWER CONVERTER WITH FREE-RUNNING OSCILLATOR

(75) Inventor: Alan Elbanhawy, Hollister, CA (US)

(73) Assignee: Fairchild Semiconductor Corporation, South Portland, ME (US)

(*) Notice: Subject to any disclaimer, the term of this patent is extended or adjusted under 35 U.S.C. 154(b) by 401 days.

(21) Appl. No.: 12/012,057

(22) Filed: Jan. 29, 2008

(51) Int. Cl.
    *H02M 3/335* (2006.01)
(52) U.S. Cl. .......................................... 363/25; 323/235
(58) Field of Classification Search ............. 363/16–20, 363/89, 65, 21.05, 21.15, 98; 323/222, 282–286, 323/234–236; 315/224, 307
See application file for complete search history.

(56) References Cited

U.S. PATENT DOCUMENTS

| | | |
|---|---|---|
| 3,491,252 A | 1/1970 | Petrohilos |
| 3,555,399 A | 1/1971 | Buchanan et al. |
| 3,840,797 A | 10/1974 | Aggen et al. |
| 3,916,224 A | 10/1975 | Daniels et al. |
| 4,072,965 A | 2/1978 | Kondo |
| 4,143,282 A | 3/1979 | Berard, Jr. et al. |
| 4,228,493 A | 10/1980 | de Sarte et al. |
| 4,236,198 A | 11/1980 | Ohsawa et al. |
| 4,495,554 A | 1/1985 | Simi et al. |
| 4,559,590 A | 12/1985 | Davidson |
| 4,622,627 A | 11/1986 | Rodriquez et al. |
| 4,695,936 A | 9/1987 | Whittle |
| 4,706,176 A | 11/1987 | Kettschau |
| 4,706,177 A | 11/1987 | Josephson |
| 4,712,169 A | 12/1987 | Albach |
| 4,720,641 A | 1/1988 | Faini |
| 4,725,769 A | 2/1988 | Cini et al. |
| 4,734,839 A | 3/1988 | Barthold |
| 4,739,462 A | 4/1988 | Farnsworth et al. |
| 4,806,844 A | 2/1989 | Claydon et al. |
| 4,809,148 A | 2/1989 | Barn |
| 4,811,184 A | 3/1989 | Koninsky et al. |
| 4,814,674 A | 3/1989 | Hrassky |

(Continued)

FOREIGN PATENT DOCUMENTS

EP        0 651 440 A1    5/1995

(Continued)

OTHER PUBLICATIONS

R. Brucker, et al., "Optimizing Converter Design and Performance Utilizing Micro Controller System Feedback and Control," Proceedings of Powercon 8, E-2, pp. 1-10, 1981.

(Continued)

*Primary Examiner*—Rajnikant B Patel
(74) *Attorney, Agent, or Firm*—Sidley Austin LLP (57) ABSTRACT

In one embodiment, a power converter system includes a switching circuitry having a plurality of switches operable to be turned on and off to cause current to flow to deliver power to a load. A driver circuitry is responsive to an oscillation signal and generates control signals for turning on and off the switches in the switching circuitry. A free-running oscillator circuitry provides the oscillation signal to the driver circuitry. The free-running oscillator circuitry has an operational amplifier. A frequency of the oscillation signal will be higher if the operational amplifier outputs a first value, and the frequency of the oscillation signal will be lower if the operational amplifier outputs a second value.

9 Claims, 6 Drawing Sheets

U.S. PATENT DOCUMENTS

| | | |
|---|---|---|
| 4,858,094 A | 8/1989 | Barlage |
| 4,862,339 A | 8/1989 | Inou et al. |
| 4,866,590 A | 9/1989 | Odaka et al. |
| 4,870,555 A | 9/1989 | White |
| 4,887,199 A | 12/1989 | Whittle |
| 4,888,497 A | 12/1989 | Dallabora et al. |
| 4,890,210 A | 12/1989 | Myers |
| 4,928,220 A | 5/1990 | White |
| 4,930,063 A | 5/1990 | Henze et al. |
| 4,937,728 A | 6/1990 | Leonardi |
| 4,943,903 A | 7/1990 | Cardwell, Jr. |
| 4,943,907 A | 7/1990 | Godwin |
| 5,012,401 A | 4/1991 | Barlage |
| 5,014,178 A | 5/1991 | Balakrishnan |
| 5,021,937 A | 6/1991 | Cohen |
| 5,034,871 A | 7/1991 | Okamoto et al. |
| 5,041,956 A | 8/1991 | Marinus |
| 5,072,353 A | 12/1991 | Feldtkeller |
| 5,086,364 A | 2/1992 | Leipold et al. |
| 5,146,394 A | 9/1992 | Ishii et al. |
| 5,161,098 A | 11/1992 | Balakrishnan |
| 5,177,408 A | 1/1993 | Marques |
| 5,200,886 A | 4/1993 | Schwarz et al. |
| 5,245,526 A | 9/1993 | Balakrishnan et al. |
| 5,297,014 A | 3/1994 | Saito et al. |
| 5,313,381 A | 5/1994 | Balakrishnan |
| 5,394,017 A | 2/1995 | Catano et al. |
| 5,452,195 A | 9/1995 | Lehr et al. |
| 5,459,392 A | 10/1995 | Mandelcorn |
| 5,461,303 A | 10/1995 | Leman et al. |
| 5,481,178 A | 1/1996 | Wilcox et al. |
| 5,508,602 A | 4/1996 | Borgato et al. |
| 5,528,131 A | 6/1996 | Marty et al. |
| 5,552,746 A | 9/1996 | Danstrom |
| 5,563,534 A | 10/1996 | Rossi et al. |
| 5,568,084 A | 10/1996 | McClure et al. |
| 5,570,057 A | 10/1996 | Palara |
| 5,572,156 A | 11/1996 | Diazzi et al. |
| 5,615,093 A * | 3/1997 | Nalbant .................. 363/25 |
| 5,617,016 A | 4/1997 | Borghi et al. |
| 5,619,403 A | 4/1997 | Ishikawa et al. |
| 5,621,629 A | 4/1997 | Hemminger et al. |
| 5,640,317 A | 6/1997 | Lei |
| 6,107,851 A | 8/2000 | Balakrishnan et al. |

FOREIGN PATENT DOCUMENTS

| | | |
|---|---|---|
| EP | 0 694 966 A1 | 1/1996 |
| EP | 0 736 957 A1 | 10/1996 |
| EP | 0 740 491 A1 | 10/1996 |
| EP | 0 748 034 A1 | 12/1996 |
| EP | 0 748 035 A1 | 12/1996 |
| EP | 0 751 621 A1 | 1/1997 |
| WO | WO 83/01157 | 3/1983 |

OTHER PUBLICATIONS

A.J. Bowen, et al., Power Supply with Optical Isolator, IBM Technical Disclosure Bulletin, vol. 14, No. 11, pp. 3320, Apr. 1972.

A. Halperin, "Primary Regulated Dual Power Supply," IBM Technical Disclosure Bulletin, vol. 21, No. 10, pp. 4299-4300, Mar. 1979.

H.S. Hoffman, Jr., et al., "Proportional Drive Supply with Diversion Control," IBM Technical Disclosure Bulletin, vol. 21, No. 12, pp. 4904-4905, May 1979.

D. Azzis, et al., "Flyback on Card Power Supply," IBM Technical Disclosure Bulletin, vol. 23, No. 4, pp. 1477-1478, Sep. 1980.

B. Pelly, et al., "Power MOSFETs Take the Load Off Switching Supply Design," Electronic Design, pp. 135-139, Feb. 1983.

"5-W DC-DC Converters Aim at Telecomm Applications," Electronic Design, vol. 31, No. 15, p. 227, Aug. 1985.

"Combined Switch-Mode Power Amplifier and Supply," IBM Technical Disclosure Bulletin, vol. 28, No. 3, pp. 1193-1195, Aug. 1985.

"Off-Line Power Supply Control Technique Using a Single Transformer to Back Three Control Signals," IBM Technical Disclosure Bulletin, vol. 32, No. 8A, Jan. 1990, pp. 272-273, Jan. 1990.

H.S. Hoffman, Jr., "Self-Generated Bias Supply," IBM Technical Disclosure Bulletin, vol. 20, No. 5, pp. 1814-1815, Oct. 1997.

Ashok Bindra, "Power-Conversion Chip Cuts Energy Wastage in Off-Line Switchers," Electric Design, pp. 46 & 48, Oct. 1998.

* cited by examiner

Efficiency @ 600KHz

FIG. 6

Efficiency as a Function of External Rg @ 2.5MHz

SYNCHRONOUS BUCK POWER CONVERTER WITH FREE-RUNNING OSCILLATOR

BACKGROUND

1. Field of Invention

The present invention relates to power conversion, and more particularly to a synchronous buck power converter with free-running oscillator.

2. Description of Related Art

Power converters are essential for many modern electronic devices. Among other capabilities, power converters can adjust voltage level downward (buck converter) or adjust voltage level upward (boost converter). Power converters may also convert from alternating current (AC) power to direct current (DC) power, or vice versa. Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." Such a power converter may be incorporated into or used to implement a power supply—i.e., a switching mode power supply (SMPS). The power converters may also include one or more capacitors or inductors for alternately storing and outputting energy.

SUMMARY

According to an embodiment of the present invention, a power converter system includes a switching circuitry having a plurality of switches operable to be turned on and off to cause current to flow to deliver power to a load. A driver circuitry is responsive to an oscillation signal and generates control signals for turning on and off the switches in the switching circuitry. A free-running oscillator circuitry provides the oscillation signal to the driver circuitry. The free-running oscillator circuitry has an operational amplifier. A frequency of the oscillation signal will be higher if the operational amplifier outputs a first value, and the frequency of the oscillation signal will be lower if the operational amplifier outputs a second value.

According to another embodiment of the present invention, a method for a power converter system includes: turning on and off a plurality of switches to cause current to flow to deliver power to a load; generating control signals with a driver circuitry for turning on and off the switches in response to a free-running oscillation signal; generating an oscillation signal with a free-running oscillator circuitry, the free-running oscillator circuitry having an operational amplifier, wherein a frequency of the oscillation signal will be higher if the operational amplifier outputs a first value, and wherein the frequency of the oscillation signal will be lower if the operational amplifier outputs a second value; and providing the oscillation signal to the driver circuitry.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1-6 of the drawings. Like numerals are used for like and corresponding parts of the various drawings. Upon reading this disclosure, a skilled artisan can understand how to implement the present invention without undue experimentation.

In some embodiments, a power converter system with free-running oscillator capable of a high-frequency (e.g., 15-20 MHz), pulse frequency modulation (PFM) operation can be implemented using non-optimized, off-the-shelf gate driver components. The power converter system can be very inexpensive to implement, for example, using an integrated circuit (IC) die having gate driver circuitry, operational amplifier (for error amplifier), and switching devices, along with a small number of discrete components. The power converter system can be ideal for module applications.

In some embodiments, as the switching frequency increases, the power converter system transitions from synchronous buck to asynchronous buck operation. The frequency at which the power converter system crosses over can be a matter of design.

Figure 1:
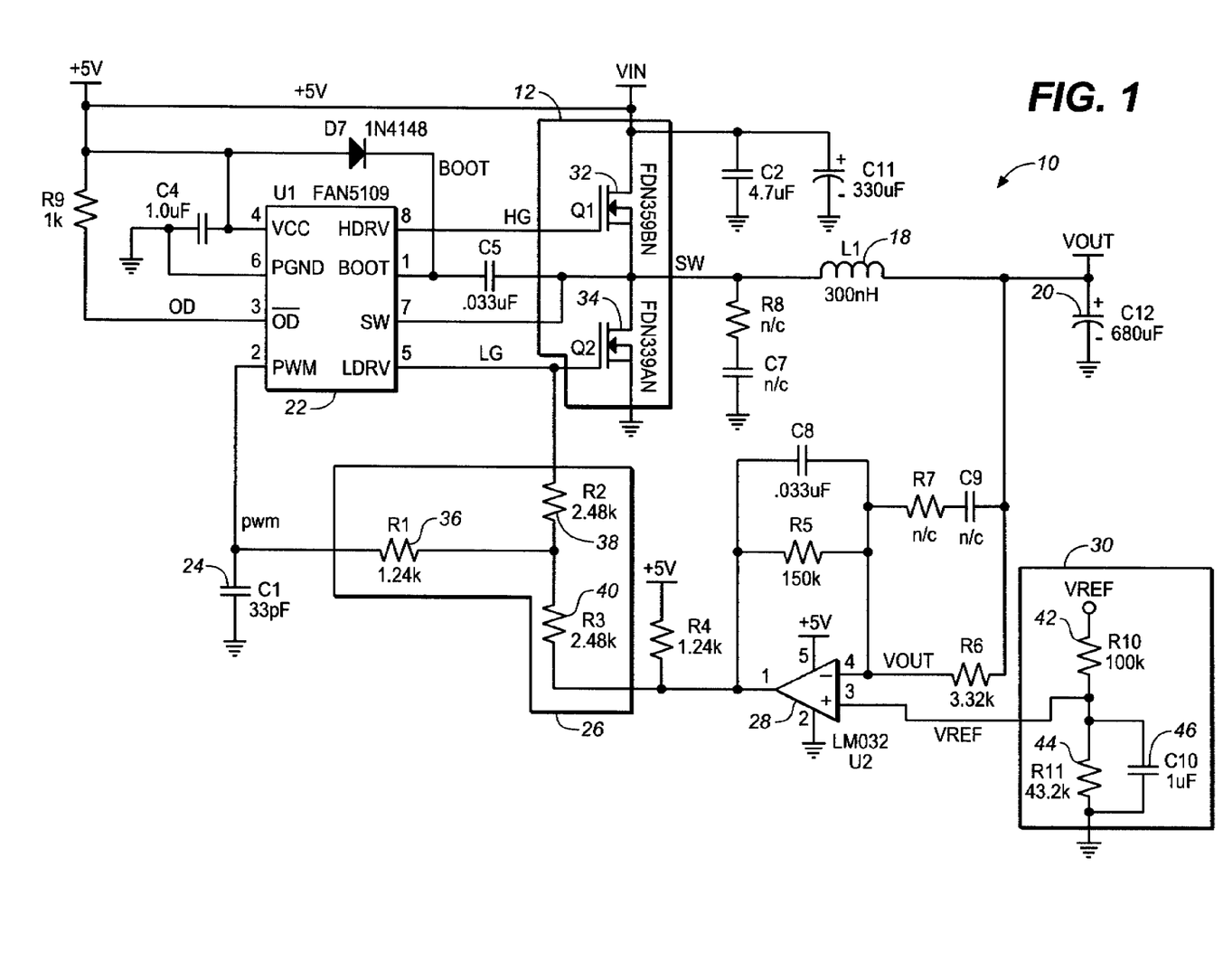
FIG. 1 is a schematic diagram of an exemplary implementation for a free-running power converter, according to an embodiment of the invention.

FIG. 1 is a schematic diagram of an exemplary implementation for a free-running power converter system 10, according to an embodiment of the invention. In one embodiment, system 10 can be a switching regulator which can, for example, provide a direct current (DC) power. Such switching regulator, in turn, can be incorporated in or used with any electronic device in which a DC-to-DC converter is needed. In one embodiment, power converter system 10 can be a buck converter which converts a voltage at a higher level (e.g., 5V) to a voltage at a lower level (e.g., 1V). The power converter system 10 can transition from synchronous buck operation to asynchronous buck operation depending on, for example, switching frequency. In other embodiments, power converter system 10 can be a boost or buck-boost converter. The power converter system 10 receives an input voltage (Vin) and provides the DC power to a load at an output terminal (Vout). As depicted in FIG. 1, the power converter system 10 may include a power train block 12, an inductor 18, an output capacitor 20, a driver circuitry 22, a timing capacitor 24, a resistor network 26, an error amplifier 28, and a reference voltage generator 30.

The inductor 18 is coupled to the output capacitor 20' at the output terminal Vout of the power converter system 10. As used herein, the terms "coupled" or "connected," or any variant thereof, covers any coupling or connection, either direct or indirect, between two or more elements. Current flows through inductor 18 for delivering power to the load at the output terminal and to charge and discharge output capacitor 20.

Power train block 12 is coupled to the inductor 18. In one embodiment, as shown, power train block 12 may comprise a first switch 32 and second switch 34 connected in a half-bridge arrangement at a switching node (SW) and to inductor 18. Switch 32 can be the "high-side" switch and the switch 34 can be the "low-side" switch. The high-side switch 32 may be connected between the input voltage Vin and node SW, and when it is turned on the current of inductor 18 ramps up due to a positive voltage between node SW and the output. The low-side switch 34 may be connected between the node SW and ground (GND), and when it is turned on the current of inductor 18 ramps down due to a negative voltage between node SW and the output. The low-side switch 34 may be used to implement synchronous rectification or asynchronous rectification by emulating a diode. Each of the two switches 32, 34 in power train block 12 can be implemented with any suitable device, such as, for example, a metal-oxide-semiconductor field effect transistor (MOSFET), an IGBT, a MOS-gated thyristor, or other suitable power device. Each switch 32, 34 has a gate to which a respective driving voltage or control signal may be applied to turn the switch on or off.

Driver circuitry 22 can be coupled to power train block 12, and may generate the control signals for turning on and off the switches 32, 34 in power train block 12. As shown, driver circuitry 22 outputs a high-side drive (HDRV) control signal for switch 32 and a low-side drive (LDRV) control signal for switch 34. In one embodiment, driver circuitry 22 can be implemented with a non-optimized, off-the-shelf gate driver circuit, such as, for example, a FAN5109 driver commercially available from Fairchild Semiconductor Corporation. A schematic diagram of an exemplary implementation for driver circuitry 22 is show in FIG. 3. Driver circuitry 22 may provide or deliver a mix of both pulse width modulation (PWM) and pulse frequency modulation (PFM) control. With PWM control, the frequency of a periodic signal is held constant and the width of each pulse is varied to form a fixed-frequency, variable-duty cycle operation. PFM control varies the frequency of the periodic signal, while the width of each pulse can be fixed percentage (e.g., 50%) of each cycle.

Driver circuitry 22 receives an oscillation signal at a control input terminal (PWM). The oscillation signal controls the values of the HDRV and LDRV control signals output from driver circuitry 22. In one embodiment, when the value of the oscillation control signal is above a certain threshold (e.g., 2.3 V), the driver circuitry 22 will output a high value for the HDRV control signal and a low value for the LDRV control signal. Alternately, when the value of the oscillation control signal is below a certain threshold (e.g., 0.8 V), the driver circuitry 22 will output a low value for the HDRV control signal and a high value for the LDRV control signal.

Timing capacitor 24 and resistor network 26 are coupled to the driver circuitry 22 at the control input terminal and are used to develop the oscillation control signal. Resistor network 26 includes resistors 36, 38, and 40. Resistors 38 and 40 form a voltage divider which is coupled between the LDRV output terminal of the driver circuitry 22 and an output of the error amplifier 28. The capacitor 24 is charged and discharged through the resistor network 26. When the LDRV output is high, current flows from the LDRV output terminal through resistors 38 and 36 to charge capacitor 24. When the LRDV output is low, current flows from the capacitor 24 out through resistors 36 and 40, thereby discharging the capacitor 24. The voltage on capacitor 24 is the value of the converter's control signal.

Error amplifier 28 is coupled to resistor network 26. Error amplifier 28 receives a reference voltage (Vref) at its non-inverting (+) input terminal and a voltage (Vout') related to or indicative of the output voltage Vout at its inverting (−) input terminal as a feedback signal. Error amplifier 28 controls how the LDRV output voltage is divided by resistors 38 and 40. If the value of Vout' is greater than the value of Vref', then error amplifier 28 outputs a low value. This in turn causes more current to flow through resistor 40, thus pulling down the voltage at the junction of resistors 36, 38, and 40. Alternately, if the value of Vout' is less than the value of Vref', then error amplifier 28 outputs a high value. This in turn causes less current to flow through resistor 40, thus allowing the voltage at the junction of resistors 36, 38, and 40 to be higher.

Reference voltage generator 30 functions to generate the reference voltage Vref'. In one embodiment, the reference voltage generator includes resistors 42, 44 (which implement a voltage divider) and a capacitor 46.

Timing capacitor 24, resistor network 26, and error amplifier 28 may implement a free-running oscillator (which has no external fixed clock) for the power converter system 10. The frequency of the free-running oscillator is determined by how rapidly timing capacitor 24 is charged and discharged. The charging and discharging of timing capacitor 24 is controlled by (or is a function of) the charging voltage for capacitor 24 at the junction of resistors 36, 38, and 40. Assuming the LDRV output voltage is high, if the output signal from the error amplifier 28 has a low value, the charging voltage at the junction of resistors 36, 38, and 40 is pulled lower (due to increased current flow through resistor 40). As such, the capacitor 24 is charged more slowly because of the lower charging voltage. Thus, the frequency of the free-running oscillator will be lower. Alternately, if the output signal from the error amplifier 28 has a high value, the charging voltage at the junction of resistors 36, 38, and 40 is higher (due to decreased current flow through resistor 40). As such, the capacitor 24 is charged more rapidly because of the higher charging voltage. Thus, the frequency of the free-running oscillator will be higher. In some embodiments, the frequency of the free-running oscillator can reach relatively high values, for example, 15-20 MHz switching frequency.

Thus, power converter system 10 is capable of high-frequency, free-running pulse frequency modulation (PFM) operation. This can be accomplished using non-optimized, off-the-shelf components, for example, for driver circuitry 22. In the topology as shown, the driver circuitry 22 forces the power converter system 10 to operate correctly as its components are part of the timing network. In contrast to previously developed designs, the power converter system 10 utilizes the input stage of the driver circuitry 22 as the modulator, thus simplifying the implementation.

In operation, power converter system 10 can operate as a synchronous buck converter. In this case, driver circuitry 22 can control low-side switch 34 in power block 12 as a synchronous rectifier. Driver circuitry 22 synchronizes the timing of both switches 32 and 34 with the switching frequency. The high-side switch 32 conducts to transfer energy from the input voltage (Vin), and the low-side switch 34 conducts to circulate the inductor current. The driver circuitry 22 regulates the output voltage (Vout) by modulating the conduction intervals of the high-side switch 32 and the low-side switch 34. The driver circuitry 22 outputs control signals which introduce some delay or dead-time between the moment that one switch is turned off and the moment that the other switch is turned on, thereby preventing shoot-through.

In some embodiments, all or a portion of the power converter system 10 shown in FIG. 1 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals therebetween. In one embodiment, for example, power block 12 (having switches 32, 34), driver circuitry 22, error amplifier 28, and reference voltage generator 30 can be provided on a single chip or die, or on one or more separate die, and the remaining elements or components implemented as discrete components. As such, power converter system 10 can be very inexpensive to implement.

Figure 2:
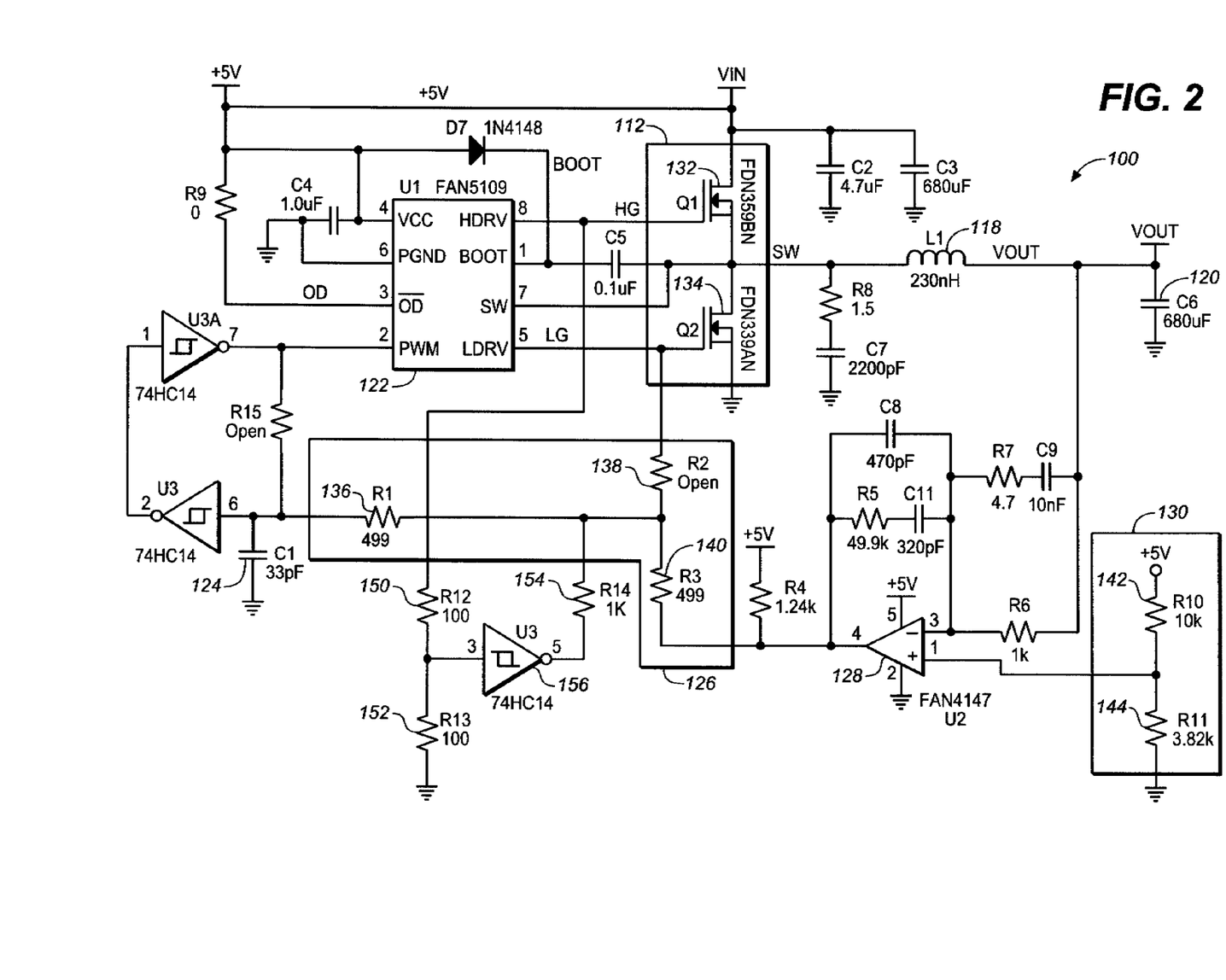
FIG. 2 is a schematic diagram of another exemplary implementation for a free-running power converter, according to an embodiment of the invention.
Figure 3:
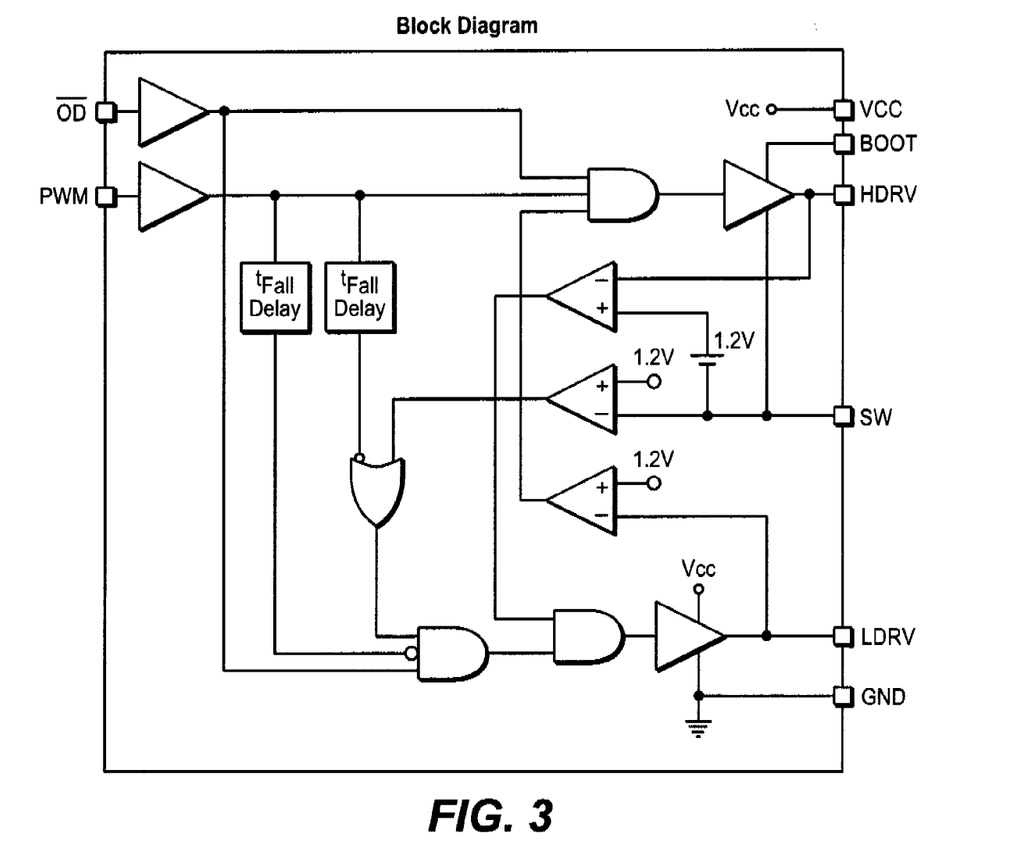
FIG. 3 is a schematic diagram of an exemplary implementation for a driver circuitry, according to an embodiment of the invention.

FIG. 2 is a schematic diagram of another exemplary implementation for a free-running power converter 100, according to an embodiment of the invention. Power converter system 100 shown in FIG. 2 is similar to power converter system 10 shown in FIG. 1. Like system 10, system 100 can be a switching regulator which can, for example, provide a direct current (DC) power. Such switching regulator, in turn, can be incorporated in or used with any electronic device in which a DC-to-DC converter is needed. In one embodiment, power converter system 100 can be a buck converter which converts a voltage at a higher level (e.g., 5V) to a voltage at a lower level (e.g., 1V). The power converter system 10 can transition from synchronous buck operation to asynchronous buck operation depending on, for example, switching frequency. The power converter system 100 receives an input voltage Vin and provides the DC power to a load at an output terminal Vout.

As shown in FIG. 2, power converter system 100 includes a power train block 112 (having switches 132, 134), an inductor 118, an output capacitor 120, a driver circuitry 122, a timing capacitor 124, a resistor network 126 (having resistors 136, 138, 140), an error amplifier 128, and a reference voltage generator 130 (having resistors 142, 144) which can operate similarly to power train block 12, inductor 18, output capacitor 20, driver circuitry 22, timing capacitor 24, resistor network 26, error amplifier 28, and reference voltage generator 30, respectively, as shown and described with reference to FIG. 1. Notable differences are as follows.

In power converter system 100 shown in FIG. 2, the HDRV output voltage of the driver circuitry 122 is also used for charging the timing capacitor 124. This is accomplished with resistors 150, 152, and 154, and an inverter 156. When only the LDRV output voltage of the driver circuitry is used for charging the timing capacitor (such as the case for power converter system 10 in FIG. 1), the maximum frequency for the free-running oscillator is limited to a lower value, such as 6-8 MHz. By also using the HDRV output voltage of the driver circuitry for charging the timing capacitor (such as the case for power converter system 100 in FIG. 2), the maximum frequency for the free-running oscillator can be increased to a higher value, such as 15-20 MHz.

In operation, at lower frequencies (e.g., 2-3 MHz), power converter system 100 can operate as a synchronous buck converter. In this case, driver circuitry 122 can control low-side switch 134 in power block 112 as a synchronous rectifier. Driver circuitry 122 synchronizes the timing of both switches 132 and 134 with the switching frequency. The high-side switch 132 conducts to transfer energy from the input voltage (Vin), and the low-side switch 134 conducts to circulate the inductor current. The driver circuitry 122 regulates the output voltage (Vout) by modulating the conduction intervals of the high-side switch 132 and the low-side switch 134. The driver circuitry 122 outputs control signals which introduce some delay or dead-time between the moment that one switch is turned off and the moment that the other switch is turned on, thereby preventing shoot-through. As the switching frequency increases, power converter system 110 can move seamlessly from synchronous buck operation to asynchronous buck operation. As an asynchronous buck converter, at higher frequencies (e.g., 8-15 MHz), low-side switch 134 emulates a diode. When the high-side switch 132 turns off, the energy in the inductor 118 forces current to circulate through the load and the low-side switch 134. The frequency at which the power converter system 110 crosses over from synchronous buck operation to asynchronous buck operation can be a design choice.

Figure 4A:
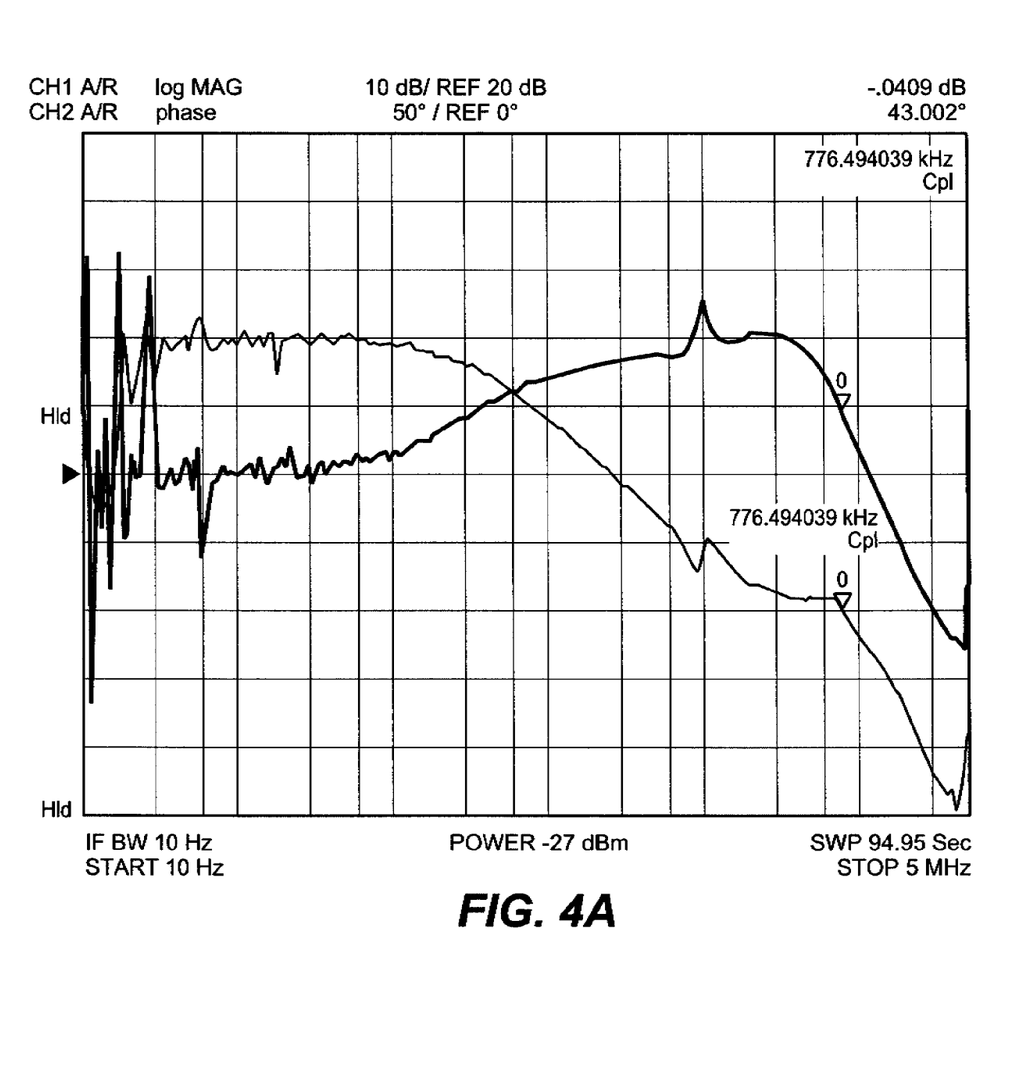
FIGS. 4A and 4B are exemplary Bode plots for a free-running power converter system, according to an embodiment of the invention.
Figure 4B:
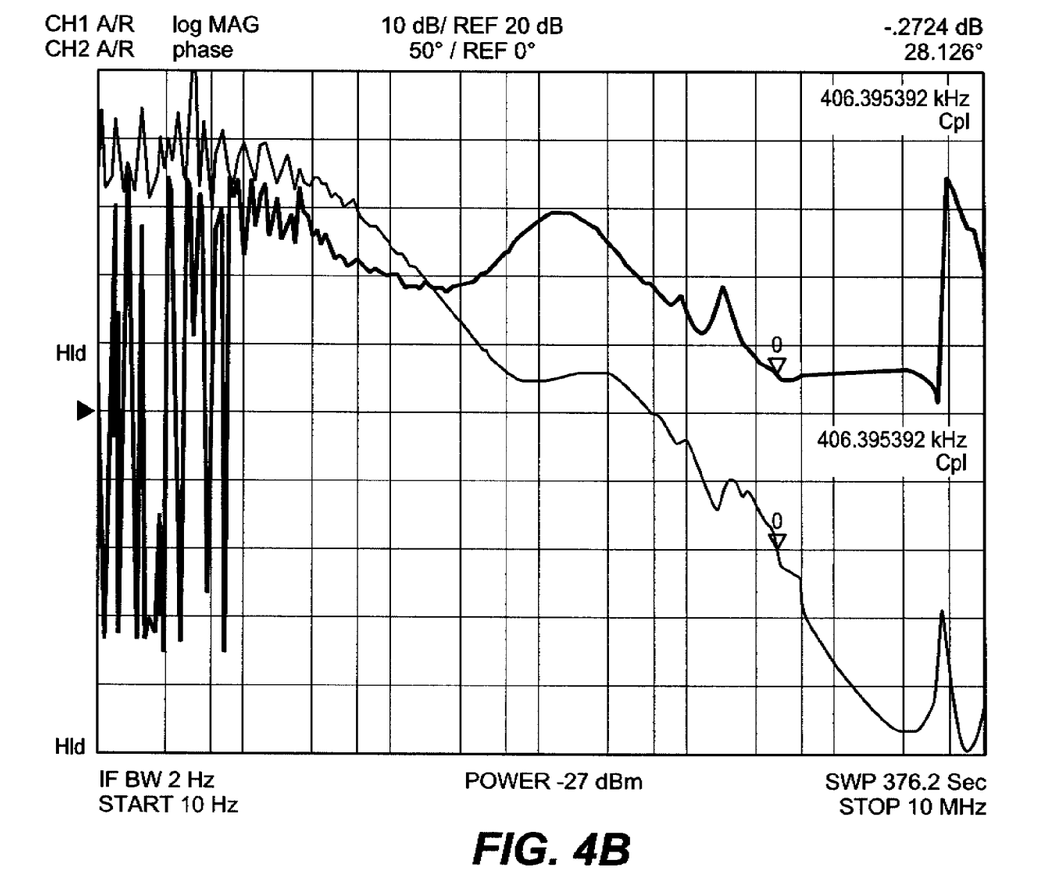

FIGS. 4A and 4B are exemplary Bode plots for a free-running power converter system, according to an embodiment of the invention. The Bode plots of FIGS. 4A and 4B show that a power converter system according to embodiments of the invention can have relatively high bandwidth.

FIG. 4A is the bandwidth when a power converter system, such as system 10 shown in FIG. 1, is implemented with one set of component values. Here, the power converter system has a bandwidth over 400 KHz at 6 amps and 5 MHz switching frequency.

FIG. 4b is the bandwidth when the same power converter system, such as system 10 shown in FIG. 1, is implemented with another set of component values. Here, the power converter system has a bandwidth over 770 KHz at 6 amps and 5 MHz switching frequency.

Figure 5:
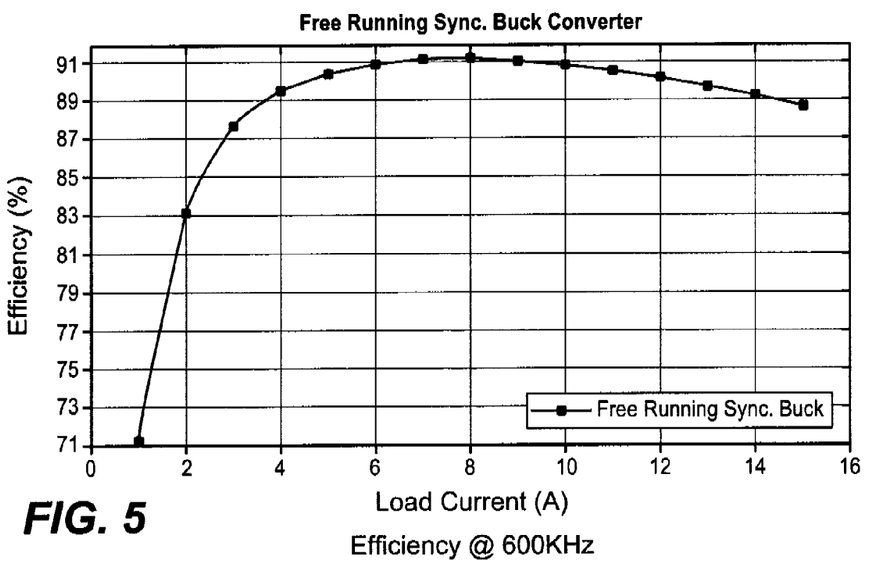
FIG. 5 is an exemplary diagram illustrating the efficiency of a free-running power converter system as a function of load at relatively low frequency, according to an embodiment of the invention.

FIG. 5 is an exemplary diagram illustrating the efficiency of a free-running power converter system as a function of load at relatively low frequency (e.g., 600 KHz), according to an embodiment of the invention. As shown in FIG. 5, the efficiency of the power converter system increases substantially (e.g., from about 70% to almost 90%) as load current increases from about 1 amp to 4 amps. For load current greater than 4 amps, the power converter system's efficiency does not change significantly (e.g., staying in the range of about 89-91%).

Figure 6:
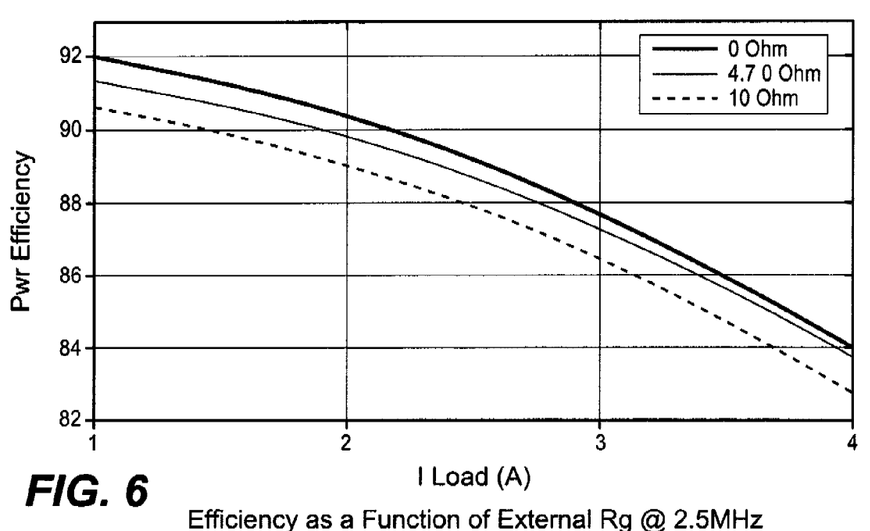
FIG. 6 is an exemplary diagram illustrating the efficiency of a free-running power converter system as a function of load at a higher frequency, according to an embodiment of the invention.

FIG. 6 is an exemplary diagram illustrating the efficiency of a free-running power converter system as a function of load at higher frequency (e.g., 2.5 MHz), according to an embodiment of the invention.

A power converter system, according to embodiments of the present invention, can deliver wide control loop bandwidth, for example, 1.1 MHz bandwidth at 5 MHz switching. Also, the power converter system may be used in any application with output power from 1-20 watt. The power converter system can provide relatively high frequency operation, for example, 15-20 MHz. The power converter system can also be ideal for modules for mobile applications. With the implementation described herein, the power converter system omits circuitry that might otherwise be used with previously developed designs. For example, the power system does not include a separate modulator stage between the error amplifier and the driver circuitry. Furthermore, because of the high bandwidth, the topology of power converter system allows the size of output inductor and output capacitor to be reduced. This allows the power converter to be implemented with a relatively small footprint or size. Thus, the power converter system can deliver a very wide range of powers (e.g., 1-20 watt), frequencies (e.g., 500 KHz-15 MHz), and control bandwidth at a relatively low cost and small size.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power converter system comprising:
a switching circuitry having a plurality of switches operable to be turned on and off to cause current to flow to deliver power to a load;
a driver circuitry responsive to an oscillation signal and operable to generate control signals for turning on and off the switches in the switching circuitry; and
a free-running oscillator circuitry operable to provide the oscillation signal to the driver circuitry, the free-running oscillator circuitry having an operational amplifier, wherein a frequency of the oscillation signal will be higher if the operational amplifier outputs a first value, and wherein the frequency of the oscillation signal will be lower if the operational amplifier outputs a second value;
wherein the free-running oscillator circuitry comprises a timing capacitor coupled to the driver circuitry, the timing capacitor operable to be charged and discharged for providing the oscillation signal, wherein the charging and discharging of the timing capacitor is responsive to the output of the operational amplifier.

2. The power converter system of claim 1 wherein the free-running oscillator circuitry comprises a resistor network coupled between the timing capacitor and the operational amplifier.

3. The power converter system of claim 2 wherein the error amplifier has a first input terminal and a second input terminal, the operational amplifier receiving a feedback signal indicative of the output voltage of the power converter system at the first input terminal, the operational amplifier receiving a reference voltage at the second input terminal, the operational amplifier operable to compare the feedback signal against the reference voltage to generate an output signal.

4. A power converter system comprising:
a switching circuitry having a plurality of switches operable to be turned on and off to cause current to flow to deliver power to a load;
a driver circuitry responsive to an oscillation signal and operable to generate control signals for turning on and off the switches in the switching circuitry; and
a free-running oscillator circuitry operable to provide the oscillation signal to the driver circuitry, the free-running oscillator circuitry having an operational amplifier, wherein a frequency of the oscillation signal will be higher if the operational amplifier outputs a first value, and wherein the frequency of the oscillation signal will be lower if the operational amplifier outputs a second value;
wherein the power converter system is operable to transition from synchronous buck operation to non-synchronous buck operation as the frequency of the oscillation signal increases.

5. A method for a power converter system comprising:
turning on and off a plurality of switches to cause current to flow to deliver power to a load;
generating control signals with a driver circuitry for turning on and off the switches in response to a free-running oscillation signal;
generating an oscillation signal with a free-running oscillator circuitry, the free-running oscillator circuitry having an operational amplifier, wherein a frequency of the oscillation signal will be higher if the operational amplifier outputs a first value, and wherein the frequency of the oscillation signal will be lower if the operational amplifier outputs a second value; and
providing the oscillation signal to the driver circuitry;
wherein generating an oscillation signal comprises charging and discharging a timing capacitor;
wherein charging and discharging of the timing capacitor is responsive to the output of the operational amplifier.

6. A method for a power converter system comprising:
turning on and off a plurality of switches to cause current to flow to deliver power to a load;
generating control signals with a driver circuitry for turning on and off the switches in response to a free-running oscillation signal;
generating an oscillation signal with a free-running oscillator circuitry, the free-running oscillator circuitry having an operational amplifier, wherein a frequency of the oscillation signal will be higher if the operational amplifier outputs a first value, and wherein the frequency of the oscillation signal will be lower if the operational amplifier outputs a second value;
providing the oscillation signal to the driver circuitry; and
transitioning from synchronous buck operation to non-synchronous buck operation as the frequency of the oscillation signal increases.

7. The method of claim 6 wherein generating an oscillation signal comprises charging and discharging a timing capacitor.

8. The method of claim 6 comprising:
receiving a feedback signal indicative of the output voltage of the power converter system at a first input terminal of the error amplifier;
receiving a reference voltage at a second input terminal of the error amplifier; and
comparing the feedback signal against the reference voltage to generate an output signal.

9. A power converter system comprising:
a switching circuitry having a plurality of switches operable to be turned on and off to cause current to flow to deliver power to a load;
a driver circuitry responsive to an oscillation signal and operable to generate control signals for turning on and off the switches in the switching circuitry; and
a free-running oscillator circuitry operable to provide the oscillation signal to the driver circuitry, the free-running oscillator circuitry comprising:
a timing capacitor coupled to the driver circuitry and operable to be charged and discharged for generating the oscillation signal;
an operational amplifier; and
a resistor network coupled between the timing capacitor and the operational amplifier;
wherein a frequency of the oscillation signal will be higher if the operational amplifier outputs a first value, and wherein the frequency of the oscillation signal will be lower if the operational amplifier outputs a second value.

* * * * *